(12) United States Patent
Azenkot et al.

(10) Patent No.: US 7,894,503 B2
(45) Date of Patent: Feb. 22, 2011

(54) SYSTEM AND METHOD OF FLEXIBLE CHANNEL ALLOCATION IN AN ULTRA WIDEBAND (UWB) FREQUENCY HOPPING COMMUNICATION SYSTEM

(75) Inventors: Yehuda Azenkot, San Jose, CA (US); Manoneet Singh, Santa Clara, CA (US); William L. Abbott, Portola Valley, CA (US); Gregory Lerner, Petach Tikva (IL)

(73) Assignee: Texas Instruments Incorporated, Dallas, TX (US)

( * ) Notice: Subject to any disclaimer, the term of this patent is extended or adjusted under 35 U.S.C. 154(b) by 890 days.

(21) Appl. No.: 11/731,932

(22) Filed: Apr. 2, 2007

(65) Prior Publication Data

US 2008/0043813 A1 Feb. 21, 2008

Related U.S. Application Data (60) Provisional application No. 60/822,583, filed on Aug. 16, 2006.

(51) Int. Cl.
*H04B 1/00* (2006.01)
(52) U.S. Cl. ....................... 375/133; 375/132
(58) Field of Classification Search ............... 375/133, 375/132, 130; 370/319; 342/150
See application file for complete search history.

(56) References Cited

U.S. PATENT DOCUMENTS

2005/0176371 A1* 8/2005 Palin et al. .................. 455/41.2
2005/0195883 A1* 9/2005 Choi et al. .................. 375/130
2006/0084406 A1* 4/2006 Strachan et al. ............. 455/334
2007/0076813 A1* 4/2007 Haartsen ..................... 375/285

OTHER PUBLICATIONS

Yehuda Azenkot et. al; MultiBand OFDM Physical Layer Specification, Draft 1.1.70E dated Dec. 21, 2006, 178 pgs, by WimiMedia Alliance, Inc., published in the United States.

* cited by examiner

*Primary Examiner*—David C Payne
*Assistant Examiner*—Brian J Stevens
(74) *Attorney, Agent, or Firm*—Steven A. Shaw; W. James Brady; Frederick J. Telecky, Jr.

(57) ABSTRACT

A system and method of flexible channel allocation in an ultra wideband frequency hopping communication system is disclosed. In one embodiment, a method includes communicating radio signals through rapidly switching among a band group 6 according to a hopping pattern. The method also includes scanning the ultra wideband spectra to determine the band group 6 based on the hopping pattern of the radio signals.

In another embodiment, a method includes scanning ultra wideband spectra to eliminate any frequency band of the ultra wideband spectra from a list of available frequency bands when the any frequency band is currently used, selecting a band group in combination of two or more frequency bands to communicate radio signals with an optimal transmission power and/or maximum range, and communicating the radio signals through rapidly switching among the band group.

10 Claims, 9 Drawing Sheets

| GROUP ID | BAND ID | LOWER FREQUENCY (MHZ) | CENTER FREQUENCY (MHZ) | UPPER FREQUENCY (MHZ) |
|---|---|---|---|---|
| GROUP 1 110 | 1 | 3168 | 3432 | 3696 |
| | 2 | 3696 | 3960 | 4224 |
| | 3 | 4224 | 4488 | 4752 |
| GROUP 2 112 | 4 | 4752 | 5016 | 5280 |
| | 5 | 5280 | 5544 | 5808 |
| | 6 | 5808 | 6072 | 6336 |
| GROUP 3 114 | 7 | 6336 | 6600 | 6864 |
| | 8 | 6864 | 7128 | 7392 |
| | 9 | 7392 | 7656 | 7920 |
| GROUP 4 116 | 10 | 7920 | 8184 | 8448 |
| | 11 | 8448 | 8712 | 8976 |
| | 12 | 8976 | 9240 | 9504 |
| GROUP 5 118 | 13 | 9504 | 9768 | 10032 |
| | 14 | 10032 | 10296 | 10560 |

120 GROUP 6

| 314 | 316 | 318 | 320 | 322 | 324 | | | | | |
|---|---|---|---|---|---|---|---|---|---|---|
| MAC TFC NUMBER | MAC BAND GROUP | PHY TFC NUMBER | PHY BAND GROUP | BASE SEQUENCE/ PREAMBLE | BAND ID FOR TFC | | | | | |
| 1 | 6 | 1 | 6 | 3 | 9 | 10 | 11 | 9 | 10 | 11 |
| 2 | 6 | 2 | 6 | 4 | 9 | 11 | 10 | 9 | 11 | 10 |
| 3 | 6 | 3 | 6 | 1 | 9 | 9 | 10 | 10 | 11 | 11 |
| 4 | 6 | 4 | 6 | 2 | 9 | 9 | 11 | 11 | 10 | 10 |
| 5 | 6 | 7 | 3 | 7 | 9 | 9 | 9 | 9 | 9 | 9 |
| 6 | 6 | 5 | 4 | 5 | 10 | 10 | 10 | 10 | 10 | 10 |
| 7 | 6 | 6 | 4 | 6 | 11 | 11 | 11 | 11 | 11 | 11 |
| 8 | 6 | 9 | 6 | 9 | 9 | 10 | 9 | 10 | 9 | 10 |
| 9 | 6 | 10 | 6 | 10 | 9 | 11 | 9 | 11 | 9 | 11 |
| 10 | 6 | 8 | 4 | 8 | 10 | 11 | 10 | 11 | 10 | 11 |

| CHANNEL ID | | | | | | | | (BAND ID, BAND ID) | | | | | | |
|---|---|---|---|---|---|---|---|---|---|---|---|---|---|---|
| (1,N) | ✕ | (1,2) | (1,3) | (1,4) | (1,5) | (1,6) | (1,7) | (1,8) | (1,9) | (1,10) | (1,11) | (1,12) | (1,13) | (1,14) |
| (2,N) | (2,1) | ✕ | (2,3) | (2,4) | (2,5) | (2,6) | (2,7) | (2,8) | (2,9) | (2,10) | (2,11) | (2,12) | (2,13) | (2,14) |
| (3,N) | (3,1) | (3,2) | ✕ | (3,4) | (3,5) | (3,6) | (3,7) | (3,8) | (3,9) | (3,10) | (3,11) | (3,12) | (3,13) | (3,14) |
| (4,N) | (4,1) | (4,2) | (4,3) | ✕ | (4,5) | (4,6) | (4,7) | (4,8) | (4,9) | (4,10) | (4,11) | (4,12) | (4,13) | (4,14) |
| (5,N) | (5,1) | (5,2) | (5,3) | (5,4) | ✕ | (5,6) | (5,7) | (5,8) | (5,9) | (5,10) | (5,11) | (5,12) | (5,13) | (5,14) |
| (6,N) | (6,1) | (6,2) | (6,3) | (6,4) | (6,5) | ✕ | (6,7) | (6,8) | (6,9) | (6,10) | (6,11) | (6,12) | (6,13) | (6,14) |
| (7,N) | (7,1) | (7,2) | (7,3) | (7,4) | (7,5) | (7,6) | ✕ | (7,8) | (7,9) | (7,10) | (7,11) | (7,12) | (7,13) | (7,14) |
| (8,N) | (8,1) | (8,2) | (8,3) | (8,4) | (8,5) | (8,6) | (8,7) | ✕ | (8,9) | (8,10) | (8,11) | (8,12) | (8,13) | (8,14) |
| (9,N) | (9,1) | (9,2) | (9,3) | (9,4) | (9,5) | (9,6) | (9,7) | (9,8) | ✕ | (9,10) | (9,11) | (9,12) | (9,13) | (9,14) |
| (10,N) | (10,1) | (10,2) | (10,3) | (10,4) | (10,5) | (10,6) | (10,7) | (10,8) | (10,9) | ✕ | (10,11) | (10,12) | (10,13) | (10,14) |
| (11,N) | (11,1) | (11,2) | (11,3) | (11,4) | (11,5) | (11,6) | (11,7) | (11,8) | (11,9) | (11,10) | ✕ | (11,12) | (11,13) | (11,14) |
| (12,N) | (12,1) | (12,2) | (12,3) | (12,4) | (12,5) | (12,6) | (12,7) | (12,8) | (12,9) | (12,10) | (12,11) | ✕ | (12,13) | (12,14) |
| (13,N) | (13,1) | (13,2) | (13,3) | (13,4) | (13,5) | (13,6) | (13,7) | (13,8) | (13,9) | (13,10) | (13,11) | (13,12) | ✕ | (13,14) |
| (14,N) | (14,1) | (14,2) | (14,3) | (14,4) | (14,5) | (14,6) | (14,7) | (14,8) | (14,9) | (14,10) | (14,11) | (14,12) | (14,13) | ✕ |

✕ NO OF BAND GROUPS = 14 X 13 = 182 BAND GROUPS

700 — LOGICAL CHANNELS HOPPING TWO BANDS

*FIG. 7*

| | |
|---|---|
| 802 → | LOGICAL CHANNELS HOPPING THREE BANDS |
| | NO OF BAND GROUPS = 14 X 13 X 12 = 2184 |
| | (1,2,3),(1,2,4)...(14,13,11),(14,13,12) |
| 804 → | LOGICAL CHANNELS HOPPING FOUR BANDS |
| | NO OF BAND GROUPS = 14 X 13 X 12 X 11 = 24024 |
| | (1,2,3,4),(1,2,3,5)...(14,13,12,10),(14,13,12,11) |
| 806 → | LOGICAL CHANNELS HOPPING FIVE BANDS |
| | NO OF BAND GROUPS = 14 X 13 X 12 X 11 X 10 = 240240 |
| | (1,2,3,4,5)...(14,13,12,11,10) |
| 808 → | LOGICAL CHANNELS HOPPING SIX BANDS |
| | NO OF BAND GROUPS = 14 X 13 X 12 X 11 X 10 X 9 = 2,162,160 |
| | (1,2,3,4,5,6)...(14,13,12,11,10,9) |
| 810 → | LOGICAL CHANNELS HOPPING SEVEN BANDS |
| | NO OF BAND GROUPS = 14!/7! |
| | (1,2,3,4,5,6,7)...(14,13,12,11,10,9,8) |
| 812 → | LOGICAL CHANNELS HOPPING EIGHT BANDS |
| | NO OF BAND GROUPS = 14!/6! |
| | (1,2,3,4,5,6,7,8)...(14,13,12,11,10,9,8,7) |
| | ○<br>○<br>○ |
| 822 → | LOGICAL CHANNELS HOPPING FOURTEEN BANDS |
| | NO OF BAND GROUPS = 14! |
| | (1,2,3,4,5,6,7,8,9,10,11,12,13,14)...(14,13,12,11,10,9,8,7,6,5,4,3,2,1) |

SYSTEM AND METHOD OF FLEXIBLE CHANNEL ALLOCATION IN AN ULTRA WIDEBAND (UWB) FREQUENCY HOPPING COMMUNICATION SYSTEM

CLAIM OF PRIORITY

This application claims priority from provisional application 60/822,583 titled "System and method for flexible channel allocation in a frequency hopping communication system" filed on Aug. 16, 2006.

FIELD OF TECHNOLOGY

This disclosure relates generally to the technical fields of telecommunication hardware and/or software, and in one embodiment, to a system and method of flexible channel allocation in an ultra wideband frequency hopping communication system.

BACKGROUND

A current ultra wideband (UWB) physical layer (PHY) specifications (e.g., by MultiBand OFDM Alliance and/or WiMedia Alliance) define 14 frequency bands (e.g., non-overlapping) bands from 3,100 MHz to 10,600 MHz. The bandwidth of each band is 528 MHz, and the center frequencies ($f_c$) of the 14 frequency bands (e.g., $n_b$ where b ranges from 1 to 14) are represented by the following equation:

$$F_c(n_b) = 2904 + 528 * n_b (\text{MHz})$$

The bands are grouped into band groups, where each of band group 1 (e.g., which includes the $1^{st}$ frequency band, the $2^{nd}$ frequency band and the $3^{rd}$ frequency band), band group 2 (e.g., which includes the $4^{th}$ frequency band, the $5^{th}$ frequency band, and the $6^{th}$ frequency band), band group 3 (e.g., which includes the $7^{th}$ frequency band, the $8^{th}$ frequency band, and the $9^{th}$ frequency band), and band group 4 (e.g., which includes the $10^{th}$ frequency band, the $11^{th}$ frequency band, and the $12^{th}$ frequency band) consists of 3 frequency bands, whereas band group 5 (e.g., which includes the $13^{th}$ frequency band and the $14^{th}$ frequency band) consists of 2 bands.

A frequency hopping (e.g., or a frequency hopping spread spectrum) may be a method of communicating radio signals by rapidly switching a carrier among many frequency channels (e.g., using a pseudorandom and/or systematic sequence known to both the transmitter and/or the receiver). Although the frequency hopping of the radio signals in general may increase power of the signal while minimizing interference, the frequency hopping in the current ultra wideband (UWB) physical layer (PHY) specifications (e.g., by MultiBand OFDM Alliance and/or WiMedia Alliance) may be limited (e.g., in effectiveness) because the current ultra wideband (UWB) physical (PHY) specifications only allows to use frequency bands (e.g., two or three) within each band group.

Furthermore, when a particular frequency band of a band group is interfered (e.g., used) by another licensed service (e.g., WiMAX, Wi-Fi, etc.), the band group which includes the particular frequency band may not be available for the frequency hopping (e.g., thus resulting in waste of the frequency bands) by a UWB device because the frequency hopping is confined within each band group according to the current ultra wideband (UWB) physical layer (PHY) specifications (e.g., by MultiBand OFDM Alliance and/or WiMedia Alliance).

SUMMARY OF THE DISCLOSURE

A system and method of flexible channel allocation in an ultra wideband frequency hopping communication system is disclosed. In one aspect, a method includes communicating radio signals through rapidly switching among a band group 6 composed of a $9^{th}$ frequency band, a $10^{th}$ frequency band, and a $11^{th}$ frequency band of ultra wideband spectra (e.g., wherein the ultra wideband spectra to include 14 frequency bands from 3100 MHz to 10,600 MHz with each of the 14 frequency bands to have a 528 MHz bandwidth) according to a hopping pattern. The method also includes scanning the ultra wideband spectra to determine the band group 6 based on the hopping pattern of the radio signals.

The radio signals are a plurality of symbols where each symbol may be carried by any one of the $9^{th}$ frequency band, the $10^{th}$ frequency band, and the $11^{th}$ frequency band (e.g., where the hopping pattern may be any one of the $9^{th}$ frequency band, the $10^{th}$ frequency band, the $11^{th}$ frequency band, the $9^{th}$ frequency band, the $10^{th}$ frequency band, and the $11^{th}$ frequency band in sequence; the $9^{th}$ frequency band, the $11^{th}$ frequency band, the $10^{th}$ frequency band, the $9^{th}$ frequency band, the $11^{th}$ frequency band, and the $10^{th}$ frequency band in sequence; the $9^{th}$ frequency band, the $9^{th}$ frequency band, the $10^{th}$ frequency band, the $10^{th}$ frequency band, the $11^{th}$ frequency band, and the $11^{th}$ frequency band in sequence; the $9^{th}$ frequency band, the $9^{th}$ frequency band, the $11^{th}$ frequency band, the $11^{th}$ frequency band, the $10^{th}$ frequency band, and the $10^{th}$ frequency band in sequence; the $9^{th}$ frequency band, the $10^{th}$ frequency band, the $9^{th}$ frequency band, the $10^{th}$ frequency band, the $9^{th}$ frequency band, and the $10^{th}$ frequency band in sequence; or the $9^{th}$ frequency band, the $11^{th}$ frequency band, the $9^{th}$ frequency band, the $11^{th}$ frequency band, the $9^{th}$ frequency band, and the $11^{th}$ frequency band in sequence).

The method may also include forming a time-frequency code synchronization detection to distinguish between the band group 6 and the band group 3 or the band group 4 during the scanning the ultra wideband spectra. In addition, the method includes allocating one or more reserved bits in a preamble of the each packet to distinguish between the band group 6 and the band group 3 and the band group 4 (e.g., where the band group 3 includes a $7^{th}$ frequency band, an $8^{th}$ frequency band, and the $9^{th}$ frequency band, and the band group 4 includes the $10^{th}$ frequency band, the $11^{th}$ frequency band, and a $12^{th}$ frequency band). Moreover, the method may include verifying the band group 6 using a legacy device when the legacy device detects the hopping pattern with one band different from the band group 4.

In another aspect, a method includes scanning ultra wideband spectra of 14 frequency bands to eliminate any frequency band of the ultra wideband spectra from a list of available frequency bands when the any frequency band of the ultra wideband spectra is currently used, selecting a band group in combination of two or more frequency bands (e.g., which may include two different frequency bands, three different frequency bands, four different frequency bands, five different frequency bands, six different frequency bands, seven different frequency bands, eight different frequency bands, nine different frequency bands, ten different frequency bands, eleven different frequency bands, twelve different frequency bands, thirteen different frequency bands, or fourteen different frequency bands of the ultra wide band spectra) of the 14 frequency bands to communicate radio signals with an optimal transmission power and/or a maximum range, and communicating the radio signals through rapidly switching among the band group (e.g., which may increase an actual transmission power of each band of the band group by 10*log 10(n) from an average transmit power of the each band of the band group while maintaining the average transmit power of the each band of the band group below −41.3 dBm/MHz).

The method may also include creating one or more additional bands through shifting any one of the 14 frequency bands to optimize a use of the ultra wideband spectra (e.g., which may move a center frequency of the any one of the 14 frequency bands by $½^n$ of the bandwidth of the any one of the 14 frequency bands, where n is a positive integer from 1 to infinity).

In yet another aspect, an ultra wideband transceiver includes a transmission module to transmit multiple symbols of radio signals through hopping among frequency bands of a band group made of any two or more frequency bands of ultra wideband spectra based on 14 frequency bands and a reception module to process the multiple symbols through determining the band group.

The ultra wideband transceiver may also include a scanning module embedded in a medium access control of the transceiver to detect any band frequency of the 14 frequency band occupied by another device. In addition, the ultra wideband transceiver may include an optimal channel module of the medium access control of the transceiver to determine the band group excluding the any band frequency of the 14 frequency band occupied by the another device to minimize any interference to the radio signals.

The methods, systems, and devices disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A system and method of flexible channel allocation in an ultra wideband frequency hopping communication system is disclosed. In the following description, for the purposes of explanation, numerous specific details are set forth in order to provide a thorough understanding of the various embodiments. It will be evident, however to one skilled in the art, that the various embodiments may be practiced without these specific details.

Figure 2:
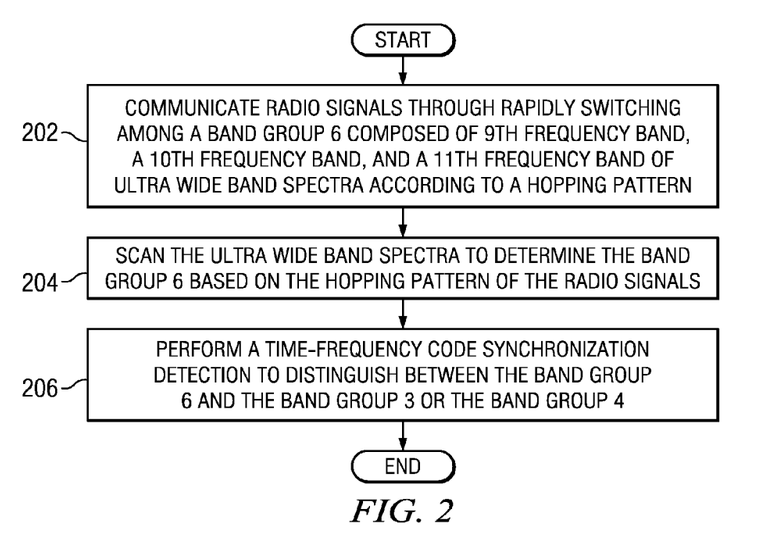
FIG. 2 is a process flow chart of communicating radio signals through rapidly switching among the band group 6 of FIG. 1A according to a hopping pattern, according to one embodiment.
Figure 3A:
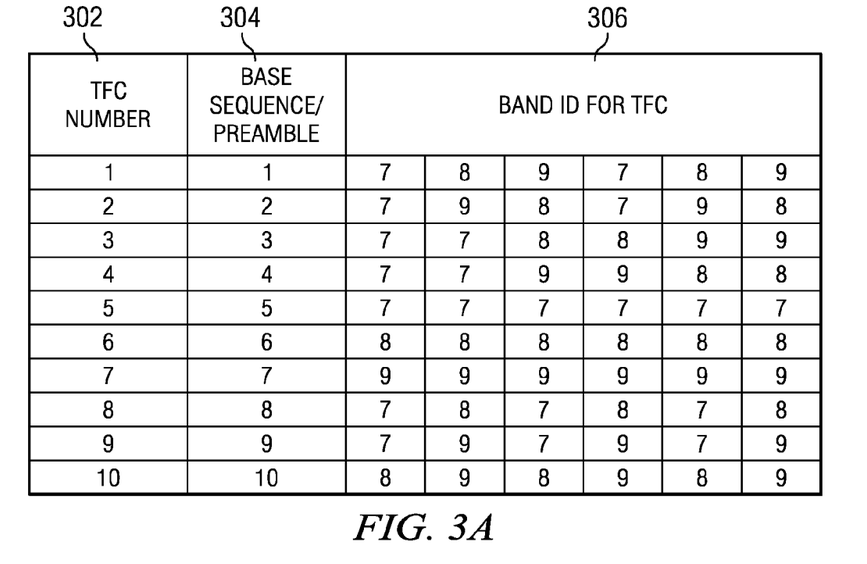
FIGS. 3A, 3B, and 3C are table views of time-frequency codes of a band group 3, a band group 4, and the band group 6, respectively, according to one embodiment.
Figure 3B:
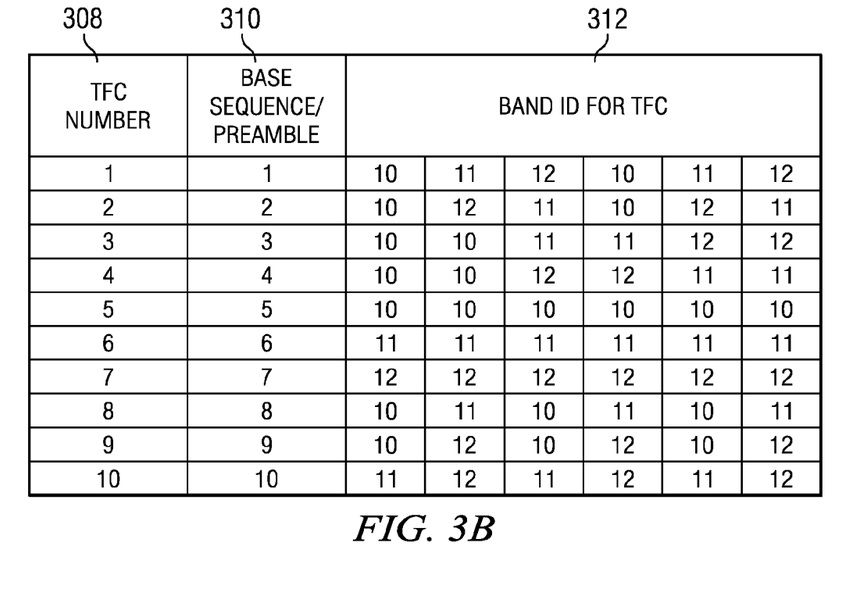
Figure 3C:
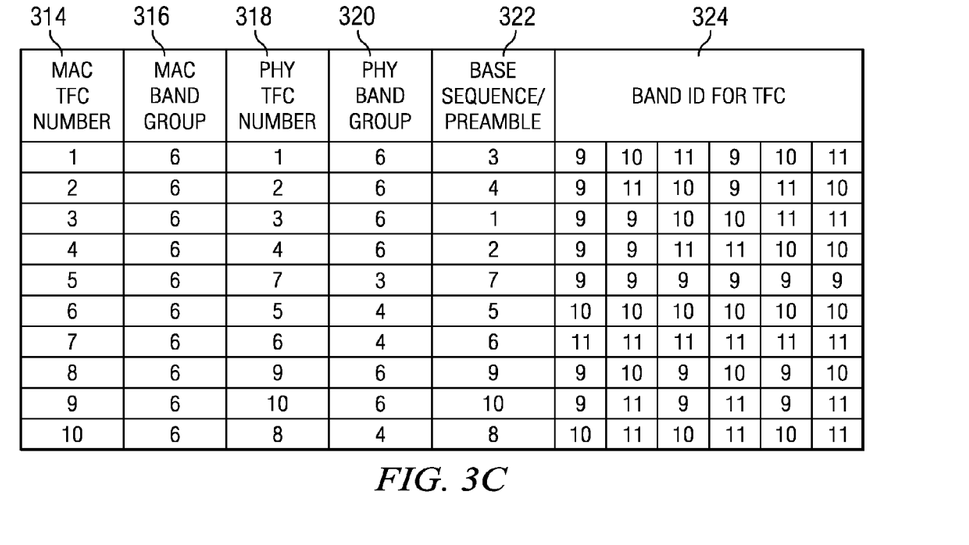

In one embodiment, a method includes communicating radio signals through rapidly switching among a band group 6 composed of a $9^{th}$ frequency band, a $10^{th}$ frequency band, and a $11^{th}$ frequency band of ultra wideband spectra according to a hopping pattern (e.g., as illustrated in FIG. 3C). The method also includes scanning the ultra wideband spectra to determine the band group 6 based on the hopping pattern of the radio signals (e.g., as illustrated in FIG. 2).

Figure 6:
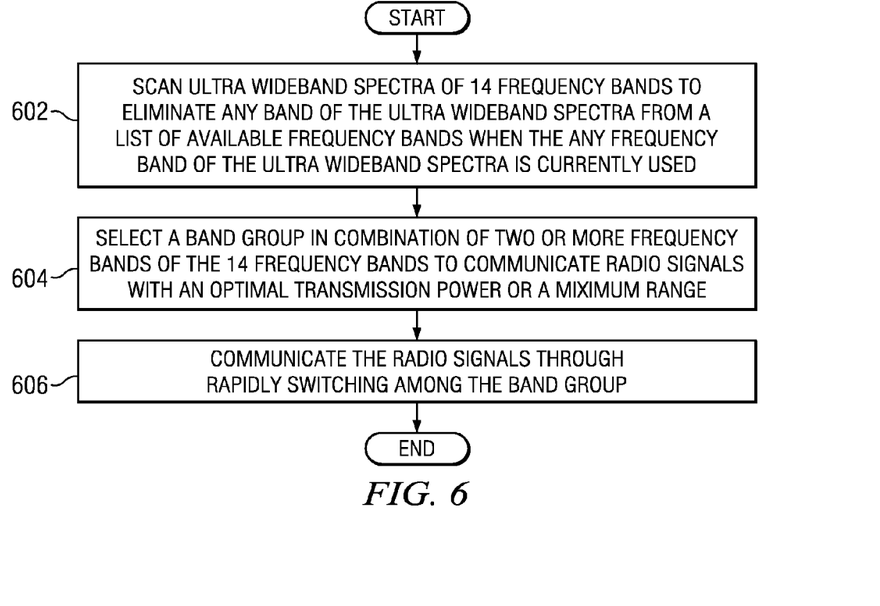
FIG. 6 is a process flow chart of selecting a band group in combination of two or more frequency bands of 14 frequency bands, according to one embodiment.

In another embodiment, a method includes scanning ultra wideband spectra of 14 frequency bands to eliminate any frequency band of the ultra wideband spectra from a list of available frequency bands when the any frequency band of the ultra wideband spectra is currently used, selecting a band group in combination of two or more frequency bands of the 14 frequency bands to communicate radio signals with an optimal transmission power and/or a maximum range, and communicating the radio signals through rapidly switching among the band group (e.g., as illustrated in FIG. 6).

Figure 9:
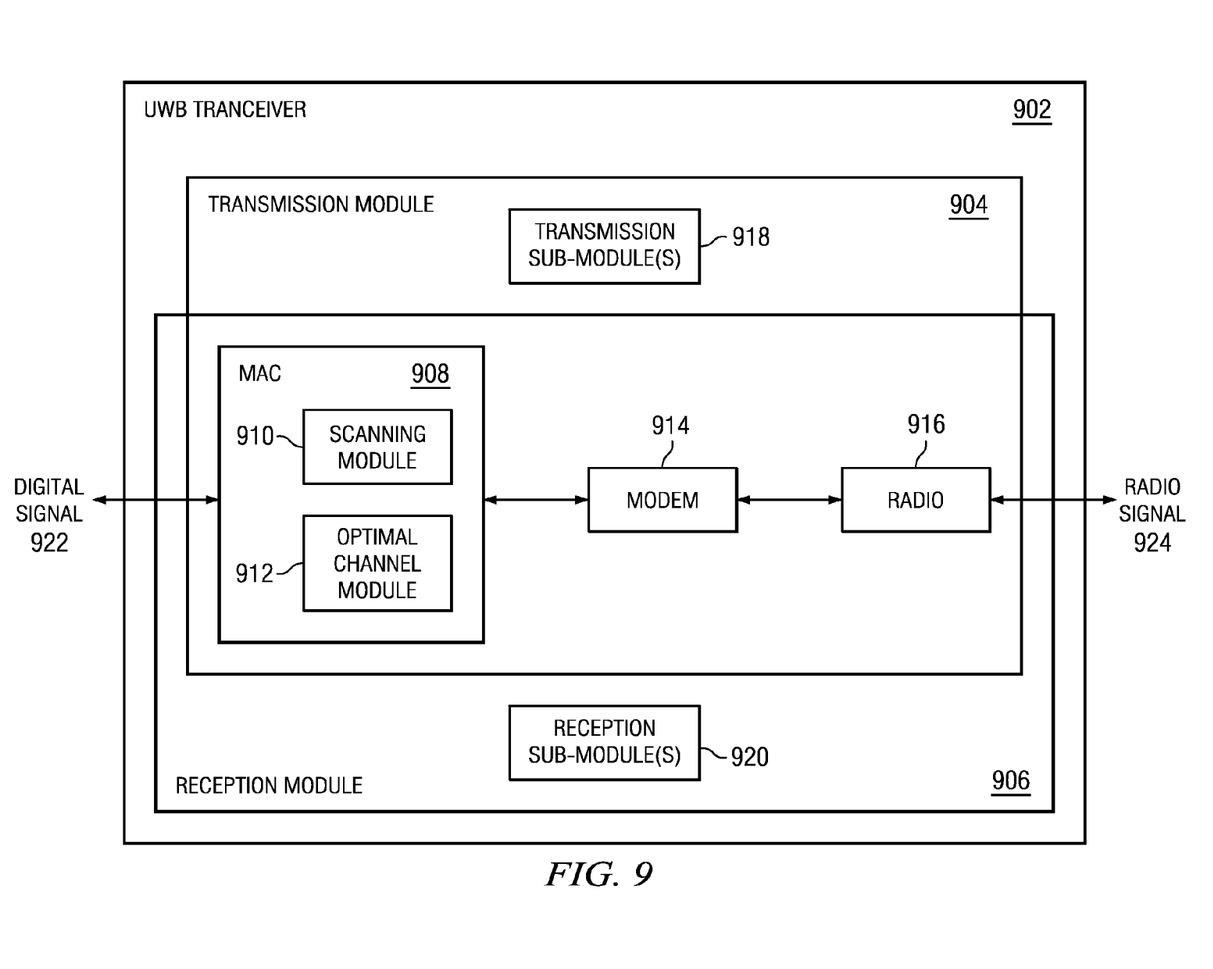
FIG. 9 is a block diagram of an ultra wideband transceiver based on a scanning module and an optimal channel module, according to one embodiment.

In yet another embodiment, an ultra wideband transceiver includes a transmission module to transmit multiple symbols of radio signals through hopping among frequency bands of a band group made of two or more frequency bands of ultra wideband spectra based on 14 frequency bands and a reception module to process the multiple symbols through determining the band group (e.g., as illustrated in FIG. 9).

Figure 1A:
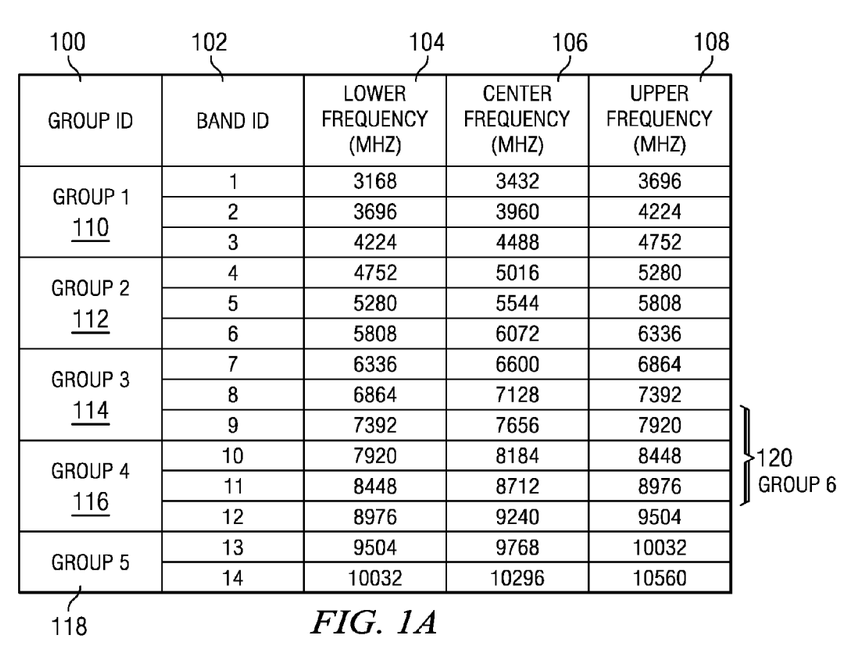
FIG. 1A is a table view of a band group 6 which may be a new addition to current band groups specified in Multi-Band OFDM Alliance (MBOA) and/or WiMedia Alliance, according to one embodiment.

FIG. 1A is a table view of a band group 6 which may be a new addition to current band groups specified in Multi-Band OFDM Alliance (MBOA) and/or WiMedia Alliance, according to one embodiment. A current ultra wideband (UWB) physical layer (PHY) specifications (e.g., by MultiBand OFDM Alliance and/or WiMedia Alliance) define 14 frequency bands (e.g., non-overlapping) bands from 3,100 MHz to 10, 600 MHz. There are currently five band groups having a group 1 110, a group 2 112, a group 3, 114, a group 4 116, and a group 5 118 as their group ID 100.

The group 1 110 includes a frequency band 1, a frequency band 2, and a frequency band 3. A lower frequency (in MHz) 104 of the frequency band 1 is 3,168 MHz. A center frequency (in MHz) 106 of the frequency band 1 is a 3,432 MHz. An upper frequency (in MHz) 108 of the frequency band 1 is 3,696 MHz. A lower frequency (in MHz) 104 of the frequency band 2 is 3,696 MHz. A center frequency (in MHz) 106 of the frequency band 2 is a 3,960 MHz. An upper frequency (in MHz) 108 of the frequency band 2 is 4,224 MHz. A lower frequency (in MHz) 104 of the frequency band 3 is 4,224 MHz. A center frequency (in MHz) 106 of the frequency band 1 is a 4,488 MHz. An upper frequency (in MHz) 108 of the frequency band 3 is 4,752 MHz.

Each of two or three frequency bands constituting each of the band groups 2 through 5 have a uniform bandwidth (e.g., 528 MHz) with a unique lower, center, and upper frequency as illustrated in FIG. 1A. The fourteen frequency bands are non-overlapping bands which stretch from 3,168 MHz to 10,560 MHz. However, according to the current Multi-Band OFDM Alliance (MBOA) and/or WiMedia Alliance specification, a band group may not be available for a frequency hopping (e.g., or a frequency hopping spread spectrum) when any one of member frequency bands (e.g., in twos or threes) is used by another device, thus resulting in a waste and/or interference.

In one example embodiment, a frequency band 8 and a frequency band 12 may be occupied by another device (e.g., a Wi-Fi device, a WiMax device, etc.). This may stop one from performing a frequency hopping based on the band group 3 or the band group 4. Nevertheless, the band group 6 composed of the frequency band 9, a frequency 10, and a frequency 11 may allow a user to salvage the frequency bands still available from the unusable band group 3 and the band group 4. Likewise, new band groups (e.g., a band group 7, a band group 8, a band group 9, etc.) may be created where the new band groups are created across the current Multi-Band OFDM Alliance (MBOA) and/or WiMedia Alliance band groups. For instance, the band group 7 may include the frequency band 2, the frequency band 3, and the frequency band 4. The band group 8 may include the frequency band 3, the frequency band 4, and the frequency band 5.

Figure 1B:
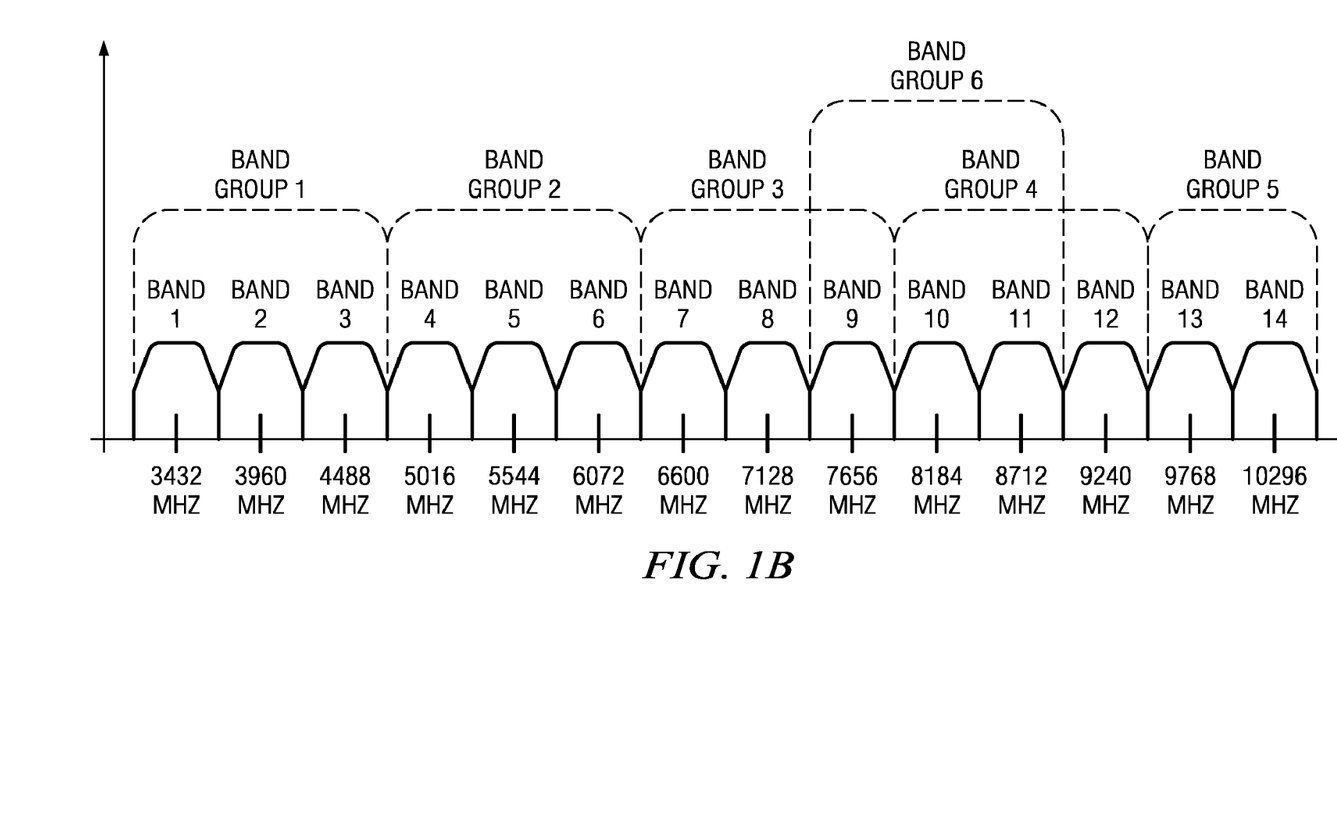
FIG. 1B is a graphical view of the band group 6 of FIG. 1A along with the current band groups, according to one embodiment.

FIG. 1B is a graphical view of the band group 6 of FIG. 1A along with the current band groups, according to one embodiment. As illustrated in FIG. 1B, the band group 6 of FIG. 1A encompasses the frequency band 9, the frequency band 10, and the frequency band 11. Accordingly, with an addition of the band group 6, one may be able to use the frequency band 9, the frequency band 10, and the frequency band 11 even when the frequency band 7 and/or the frequency band 8 of the band group 3 and/or the frequency band 12 of the band group 4 are being used by another device.

FIG. 2 is a process flow chart of communicating radio signals through rapidly switching among the band group 6 of FIG. 1A according to a hopping pattern, according to one embodiment. In operation 202, radio signals may be communicated through rapidly switching among the band group 6 (e.g., composed of the frequency band 9, the frequency band 10, and the frequency band 11 of ultra wideband (UWB) spectra) according to a hopping pattern (e.g., which may be a pseudorandom or preplanned). In operation 204, the ultra wideband spectra (e.g., which may encompass 14 non-overlapping frequency bands from 3,168 MHz to 10,560 with each of the 14 frequency bands to have a 528 MHz bandwidth) may be scanned to determine the band group 6 based on the hopping pattern of the radio signals. In operation 206, a time-frequency code synchronization detection may be performed to distinguish between the band group 6 and the band group 3 or the band group 4.

FIGS. 3A, 3B, and 3C are table views of time-frequency codes of a band group 3, a band group 4, and the band group 6, respectively, according to one embodiment. The current Multi-Band OFDM Alliance (MBOA) and/or WiMedia Alliance specification defines a time-frequency code (TFC) as a time-frequency interleaving (TFI) where the coded information is interleaved (e.g., data in a non-contiguous way in order to increase performance) over two or three bands and/or a fixed frequency interleaving (FFI) where the coded information is transmitted on a single band. FIG. 3A illustrates time-frequency codes for the band group 3. The first four TFC codes of the band group 3 are the time-frequency interleaving (TFI) of three bands. The $5^{th}$ through the $7^{th}$ TFC codes of the band group 3 are the fixed frequency interleaving (FFI). The $8^{th}$ through the $10^{th}$ TFC codes of the band group 3 are the time-frequency interleaving (TFI) of two bands.

FIG. 3B illustrates time-frequency codes for the band group 4. The first four TFC codes of the band group 4 are the time-frequency interleaving (TFI) of three bands. The $5^{th}$ through the $7^{th}$ TFC codes of the band group 4 are the fixed frequency interleaving (FFI). The $8^{th}$ through the $10^{th}$ TFC codes of the band group 4 are the time-frequency interleaving (TFI) of two bands.

FIG. 3C illustrates time-frequency codes (TFCs) for the band group 6. The first four TFCs of the band group 6 are the time-frequency interleaving (TFI) of three bands (e.g., the $9^{th}$, $10^{th}$, and $11^{th}$ frequency bands). The $5^{th}$ through the $7^{th}$ TFCs of the band group 6 are the fixed frequency interleaving (FFI) where the $5^{th}$ TFC is identical to the $7^{th}$ TFC of the band group 3 and the $6^{th}$ and the $7^{th}$ TFCs are identical to the $5^{th}$ and the $6^{th}$ TFCs of the band group 4. The $8^{th}$ through the $10^{th}$ TFCs of the band group 6 are the time-frequency interleaving (TFI) of two bands where the $10^{th}$ TFC of the band group 6 is identical to the $8^{th}$ TFC of the band group 4. Thus, the band group 6 may support four new TFI channels with 3 frequency bands and two new TFI channels with 2 frequency bands.

In one example embodiment, a transceiver may invoke a reserved bit in its preamble to distinguish between the band group 4 and the band group 6 where a band group least significant bit (LSB) is configured as 1 for the band groups 1, 3, and 5, but 0 for the band groups 2, 4, and 6. The reserved bit is necessary in the example because the band group LSB is 0 for both the band group 4 and the band group 6.

In another example embodiment, a legacy device (e.g., which does not recognize the band group 6) may be confused when it processes the preamble. Also, new stations (e.g., devices) supporting the band group 6 may be confused by the preamble synchronization sequence (e.g., which is used to aid the receiver in timing synchronization, carrier off-set recovery, and/or channel estimation) because the TFCs 1 through 4 (e.g., synchronization sequence) in regards to the $9^{th}$ frequency band (e.g., band 9) are same for the band group 3 and the band group 6, as illustrated in FIG. 3A and FIG. 3C and/or because the TFCs 1 through 4 in regards to the $10^{th}$ and the $11^{th}$ frequency bands are same for the band group 4 and the band group 6, as illustrated in FIG. 3B and FIG. 3C. Thus, the receiver (e.g., of the new stations) may have additional steps (e.g., an algorithm) to distinguish between the band group 6 and the band group 3 or the band group 4 (e.g., in a channel scan mode).

In yet another example embodiment, new TFCs may be proposed for the band group 6 where TFCs 1, 2, 3, and 4 of the band group 6 are reassigned as the TFCs 2, 1, 4, and 3, respectively, as the TFCs 3, 4, 1, and 2, or the TFCs 4, 3, 2, 1. These new TFC definitions may require fewer symbols to resolve difference between the band group 6 and the band group 4 (e.g., or the band group 3), thus reducing channel scan time and/or resolving aliasing ambiguity.

Figure 4:
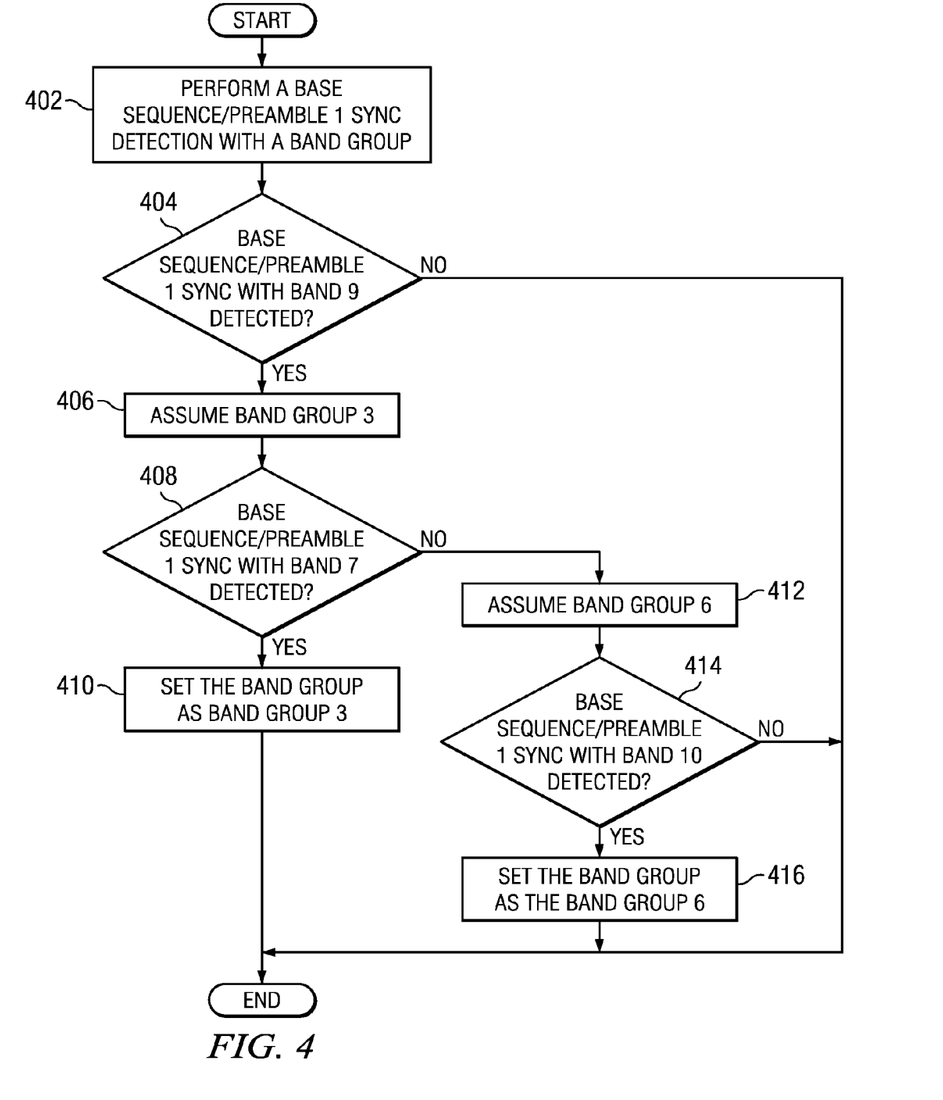
FIG. 4 is a flow chart of performing a time-frequency code 1 synchronization detection to distinguish between the band group 3 of FIG. 3A and the band group 6 of FIG. 3C, according to one embodiment.

FIG. 4 is a flow chart of performing a base sequence/preamble 1 (e.g., which is 7, 8, 9, 7, 8, 9 for the band group 3 and 9, 9, 10, 10, 11, 11 for the band group 6) synchronization detection to distinguish between the band group 3 of FIG. 3A and the band group 6 of FIG. 3C, according to one embodiment. Thus, additional steps (e.g., in a receiver) to distinguish between the band group 6 and the band group 3 (e.g., in a channel scan mode) may be initiated through performing the base sequence/preamble 1 synchronization (sync) detection with a band group in operation 402. If the base sequence/preamble 1 sync with the band 9 (e.g., the $9^{th}$ frequency band) is not detected in operation 404, the band group 6 is ruled out. If the base sequence/preamble 1 sync with the band 9 is detected, the band group 3 is assumed in operation 406. If the base sequence/preamble 1 sync with the band 7 (e.g., the $7^{th}$ frequency band) is detected in operation 408, the band group is set as the band group 3 in operation 410. Otherwise, the band group 6 is assumed in operation 412. If the base sequence/preamble 1 sync with the band 10 (e.g., the $10^{th}$ frequency band) is detected in operation 414, the band group is set as the band group 6 in operation 416.

In another example embodiment, a TFC 3 sync detection may be performed (e.g., by the receiver) with a band group. If the band 9 is detected, the receiver may determine which symbol of the pair was received through trying to detect another sync with the band 9. If the another sync is detected, the first symbol detected is the first of the pair. If not, the first symbol detected is the second of the pair. Once the band 9 is detected, the receiver assumes the band group 3 and tries to detect the TFC 3 sync on the band 7. If it succeeds, the band group may be set as the band group 3. If the TFC 3 sync on the band 7 fails, the receiver may try to detect the TFC 3 sync on the band 10 if the first detected symbol was the first of the pair, or on the band 11 if the first detected symbol was the second symbol of the pair. If either of the operations succeeds, the band group may be set as the band group 6. This algorithm may consume up to 4 symbols to distinguish between the band group 3 and the band group 6.

In yet another example embodiment, one or more reserved bits in a preamble of each symbol may be allocated to distinguish between the band group 6 and the band group 3.

Figure 5:
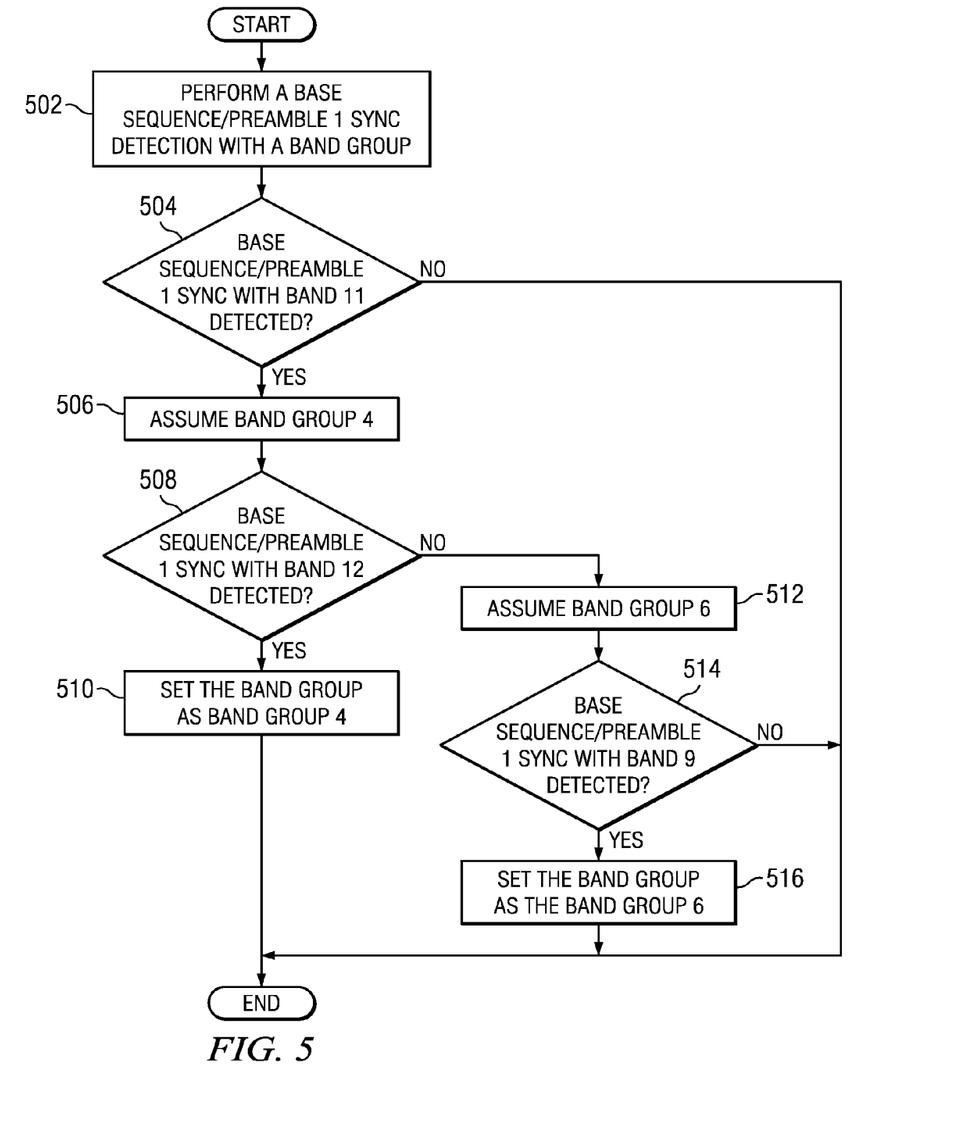
FIG. 5 is a flow chart of performing a time-frequency code 1 synchronization detection to distinguish between the band group 4 of FIG. 3B and the band group 6 of FIG. 3C, according to one embodiment.

FIG. 5 is a flow chart of performing a base sequence/preamble 1 (e.g., which is 10, 11, 12, 10, 11, 12 for the band group 4 and 9, 9, 10, 10, 11, 11 for the band group 6) synchronization detection to distinguish between the band group 4 of FIG. 3B and the band group 6 of FIG. 3C, according to one embodiment. Additional steps (e.g., in a receiver) to distinguish between the band group 6 and the band group 4 (e.g., in a channel scan mode) may be initiated through performing the base sequence/preamble 1 synchronization (sync) detection with a band group in operation 502. If the base sequence/preamble 1 sync with the band 10 and the band 11 (e.g., the $10^{th}$ and the $11^{th}$ frequency bands) is not detected in operation 504, the band group 6 is ruled out. If the base sequence/preamble sync with the band 10 and the band 11 is detected, the band group 4 is assumed in operation 506. If the base sequence/preamble 1 sync with the band 12 (e.g., the $12^{th}$ frequency band) is detected in operation 508, the band group is set as the band group 4 in operation 510. Otherwise, the band group 6 is assumed in operation 512. If the base sequence/preamble 1 sync with the band 9 (e.g., the $9^{th}$ frequency band) is detected in operation 514, the band group is set as the band group 6 in operation 516. This algorithm may consume up to 4 symbols to distinguish between the band group 4 and the band group 6.

In another example embodiment, the TFC 3 sync detection may be performed (e.g., by the receiver) with a band group. If the band 10 is detected, the receiver may determine which symbol of the pair was received through trying to detect another sync with the band 10. If the another sync is detected, the first symbol detected is the first of the pair. If not, the first symbol detected is the second of the pair. The receiver should detect the TFC 3 sync on the band 11 for one or two symbols when another TFC 3 sync detection is performed on the following symbol (e.g., or two symbols). If so, the receiver assumes the band group 4 and tries to detect the TFC 3 sync on the band 12. If it succeeds, the band group may be set as the band group 4. If the TFC 3 sync on the band 12 fails, the receiver may try to detect the TFC 3 sync on the band 9. If succeeds, the band group may be set as the band group 6. This algorithm may consume up to 6 symbols to distinguish the band group 6 and the band group 4.

In yet another example embodiment, one or more reserved bits in a preamble of each symbol may be allocated to distinguish between the band group 6 and the band group 4. In addition, the band group 6 may be verified using a legacy device (e.g., which was built before the definition of the band group 6 came about) when the legacy device detects the hopping pattern with one band different from the band group 4.

FIG. 6 is a process flow chart of selecting a band group in combination of two or more frequency bands of 14 frequency bands, according to one embodiment. In operation 602, ultra wideband spectra of 14 frequency bands may be scanned to eliminate from a list of available frequency bands when the any frequency band of the ultra wideband spectra is currently used (e.g. by another device). In operation 604, a band group in combination of two or more frequency bands of the 14 frequency bands may be selected to communicate radio signals with an optimal transmission power or a maximum range.

In operation 606, the radio signals may be communicated through rapidly switching (e.g., which may increase an actual transmission power of each band of the band group by 10*log 10(n) (e.g., n=number of bands switched across) from an average transmit power of the each band of the band group while maintaining the average transmit power of the each band of the band group below −41.3 dBm/MHz) among the band group. In one example embodiment, one or more additional bands may be created through shifting any one of the 14 frequency bands (e.g., by ½, ¼, ⅛, etc. of the one or more additional bands) to optimize a use of the ultra wideband spectra.

Figure 7:
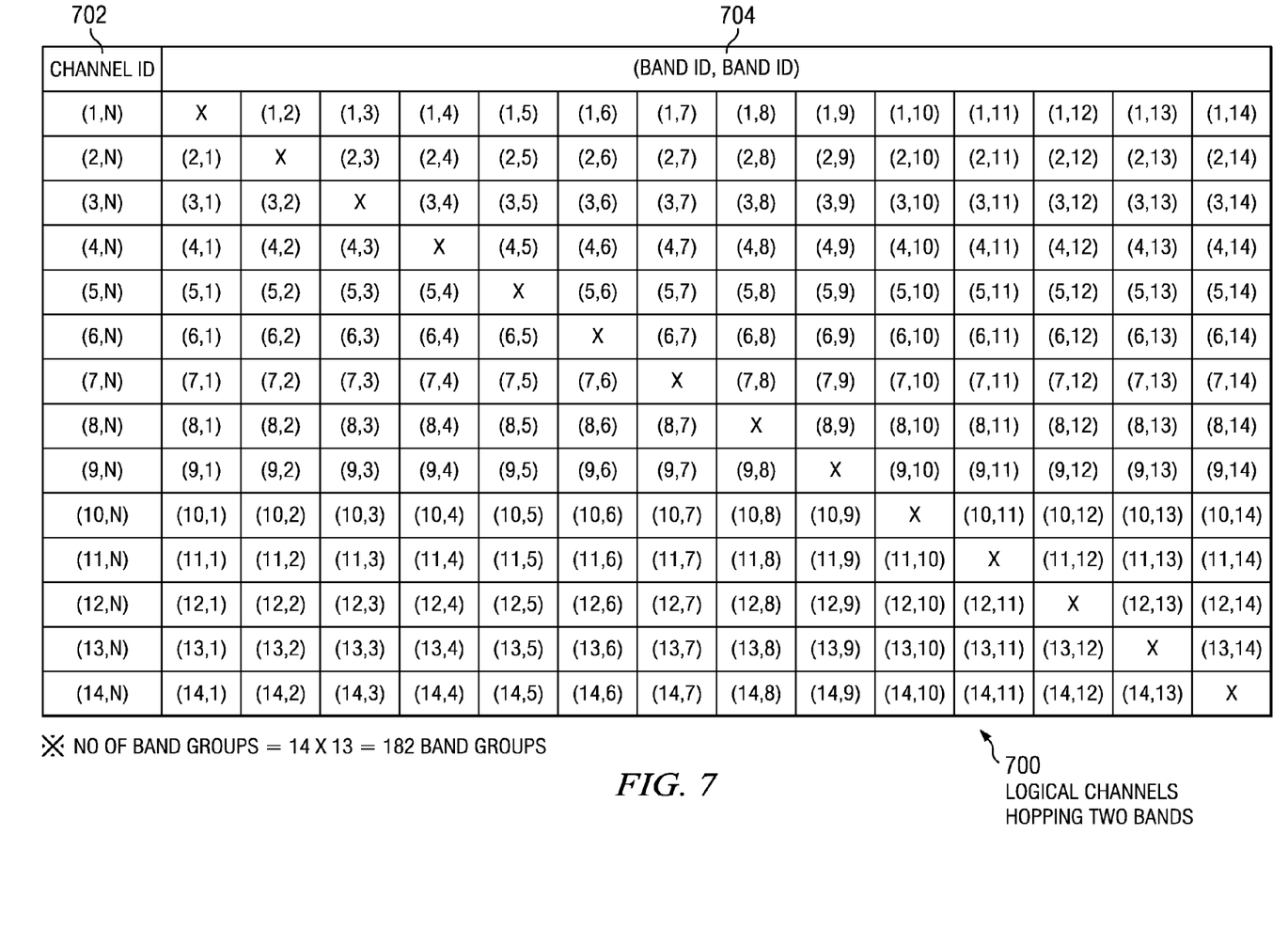
FIG. 7 is a table view of logical channels hopping two bands, according to one embodiment.

FIG. 7 is a table view of logical channels hopping two bands, according to one embodiment. As illustrated in FIG. 7, selecting a band group in combination of two frequency bands (e.g., among the 14 frequency bands of the ultra wideband spectra) results in 182 hopping patterns (e.g., or logical channels). This scheme may not be limited by the current Multi-Band OFDM Alliance (MBOA) and/or WiMedia Alliance specification which prevent a frequency hopping across band groups (e.g., band groups 1 through 5).

Figure 8:
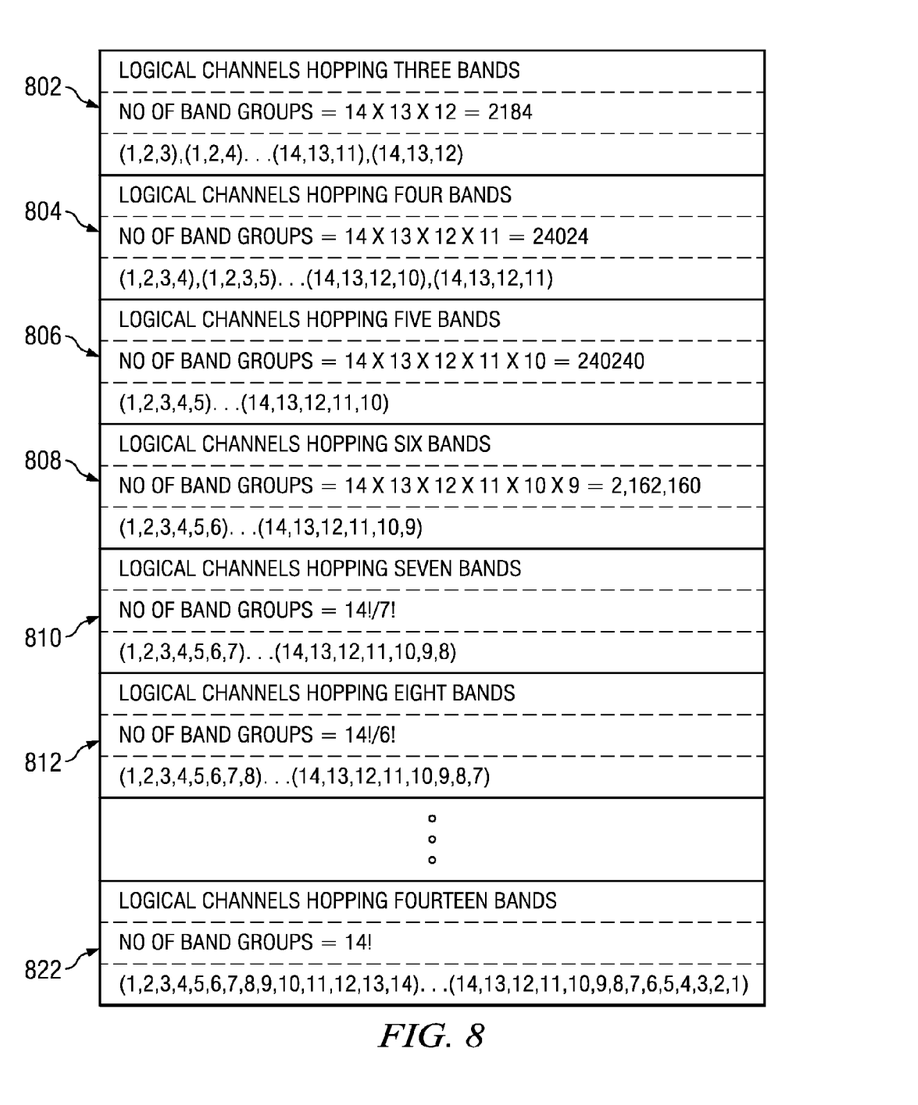
FIG. 8 is a summary view of logical channels hopping between three bands and fourteen bands, according to one embodiment.

FIG. 8 is a summary view of logical channels hopping between three bands and fourteen bands, according to one embodiment. As illustrated in FIG. 8, selecting a band group in combination of three bands results in 14!/11! (2184) logical channels hopping three bands 802 (e.g., groups). Selecting a band group in combination in four bands results in 14!/10! (24,024) logical channels hopping four bands 804. Selecting a band group in combination of five bands results in 14!/9! logical channels hopping five bands 806. Accordingly, selecting a band group in combination of n number of bands results in 14!/(14-n)! logical channel hopping n band(s). This scheme may free up many unused (e.g., unoccupied) free frequency bands in the ultra wideband spectra. Also, hopping more number of frequency bands (e.g., more than 3 bands) may result in higher power and/or longer ranger of the radio signals.

FIG. 9 is a block diagram of an ultra wideband transceiver based on a scanning module and an optimal channel module, according to one embodiment. An ultra wideband transceiver 902 includes a transmission module 904 (e.g., which may transmit one or more symbols of radio signals through hopping between frequency bands made of at least two frequency bands) and a reception module 906 (e.g., which may process the one or more symbols through determining the band group). The transmission module 904 includes a medium access control (MAC) 908 having a scanning module 910 and an optimal channel module 912, a modem 914, a radio 916, and transmission sub-modules 918. The reception module 906 includes the medium access module (MAC) 908 having the scanning module 910 and the optimal channel module 912, the modem 914, the radio 916, and reception sub-modules 920.

During a transmission mode of the UWB transceiver 902, the scanning module 910 (e.g., which may be embedded in a CPU) of the MAC 908 may initiate scanning of individual frequency bands (e.g., the 14 frequency bands) of the ultra wideband spectra. When any of the individual frequency bands is used by another device, the any of the individual frequency bands may be listed as "unavailable" and ruled out from the consideration of a band group which will be used by the UWB transceiver 902. From available (e.g., free) frequency bands, the optimal channel module 912 may be used to select two or more frequency bands which would provide an optimal channel power (e.g., and/or maximum range). Once a band group for a frequency hopping is determined, the MAC 908 may interact with the modem 914 and the radio 916 to modulate (e.g., based on the orthogonal frequency-division multiplexing) a digital signal 922 and transmit as a radio signal 924 according to a time-frequency code (e.g., which may be preplanned or pseudorandom).

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated ASIC circuitry and/or in Digital Signal; Processor DSP circuitry).

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A method of flexible channel allocation, comprising:
defining an overlapping band group 6 composed of a $9^{th}$ frequency band, a $10^{th}$ frequency band, and a $11^{th}$ frequency band of ultra wideband spectra;
receiving communications via a transceiver radio signals through rapidly switching among the overlapping band group 6 according to a flexible hopping pattern, wherein the radio signals are a plurality of symbols with each symbol carried by any one of the $9^{th}$ frequency band, the $10^{th}$ frequency band, and the $11^{th}$ frequency band and wherein the hopping pattern of the band group 6 to include the $9^{th}$ frequency band, the $10^{th}$ frequency band, the $11^{th}$ frequency band;
scanning the ultra wideband spectra to determine the overlapping band group 6 based on the flexible hopping pattern of the radio signals, wherein the ultra wideband spectra to include 14 frequency bands from 3100 MHz to 10,600MHz with each of the 14 frequency bands to have a 528 MHz bandwidth;
performing a time-frequency code synchronization detection to distinguish between the band group 6 and the at least one of a band group 3 and a band group 4 during the scanning the ultra wideband spectra;
allocating at least one reserved bit in a preamble of the each symbol to distinguish between the band group 6 and at least one of the band group 3 and the band group 4, wherein the band group 3 to include a $7^{th}$ frequency band, an $8^{th}$ frequency band, and the $9^{th}$ frequency band, and the band group 4 to include the $10^{th}$ frequency band, the $11^{th}$ frequency band, and a $12^{th}$ frequency band; and
dynamically determining at the transceiver that the overlapping band group 6 is allocated instead of other band groups.

2. The method of claim 1, wherein the hopping pattern of the band group 6 of the $9^{th}$ frequency band, the $10^{th}$ frequency band, and the $11^{th}$ frequency band is hopped in sequence.

3. The method of claim 1, wherein the hopping pattern of the band group 6 is the $9^{th}$ frequency band, the $11^{th}$ frequency band, and the $10^{th}$ frequency band hopped in sequence.

4. The method of claim 1, wherein the hopping pattern of the band group 6 is the $10^{th}$ frequency band, the $11^{th}$ frequency band, and the $11^{th}$ frequency band hopped in sequence.

5. The method of claim 1, wherein the hopping pattern of the band group 6 is the $11^{th}$ frequency band, the $10^{th}$ frequency band, and the $10^{th}$ frequency band hopped in sequence.

6. The method of claim 1, wherein the hopping pattern of the band group 6 is the $10^{th}$ frequency band, the $9^{th}$ frequency band, and the $10^{th}$ frequency band hopped in sequence.

7. The method of claim 1, wherein the hopping pattern of the band group 6 is the $11^{th}$ frequency band, the $9^{th}$ frequency band, and the $11^{th}$ frequency band hopped in sequence.

8. The method of claim 1, further comprising verifying the band group 6 using a legacy device when the legacy device detects the hopping pattern with one band different from the band group 4.

9. The method of claim 1, further comprising reassigning preamble base sequences to time-frequency codes (TFCs) of the band group 6 such that at least 1 or 2 fewer symbols are required to distinguish between the band group 6 and at least one of a band group 3 and a band group 4.

10. The method of claim 1 in a form of a machine-readable medium embodying a set of instructions that, when executed by a machine, causes the machine to perform the method of claim 1.

* * * * *